United States Patent [19]

Vartanian et al.

[11] 4,246,506

[45] Jan. 20, 1981

[54] CURRENT SUPPLYING DEVICE FOR ROTOR WINDING OF ELECTRIC MACHINE

[76] Inventors: Gurgen P. Vartanian, ulitsa Budapeshtskaya, 15, korpus 2, kv. 29; Vladimir S. Vitchenko, Vitebsky prospekt 29, korpus 2, kv. 142; Gennady K. Smirnov, ulitsa Prazhskaya, 20, kv. 132; Vladimir G. Shalaev, Novo-Izmailovsky, 55, kv. 92, all of Lenigrad, U.S.S.R.

[21] Appl. No.: 956,892

[22] Filed: Nov. 2, 1978

[51] Int. Cl.³ .......................................... H02K 13/00
[52] U.S. Cl. ................................... 310/232; 310/165; 310/227
[58] Field of Search .................... 310/232, 68 R, 227, 310/71, 61, 54, 60 A, 165; 339/5 L, 6 R, 8 L

[56] References Cited

U.S. PATENT DOCUMENTS

| | | | |
|---|---|---|---|
| 2,798,977 | 7/1957 | Henter | 310/232 |
| 3,023,331 | 2/1962 | Hoffmann | 310/232 |
| 3,784,855 | 1/1974 | Motegi | 310/227 |
| 3,955,111 | 5/1976 | Weghaupt | 310/232 |
| 3,965,379 | 6/1976 | Meusel | 310/68 R |
| 4,066,921 | 1/1978 | Blank | 310/68 R |
| 4,137,474 | 1/1979 | Krieger | 310/227 |

FOREIGN PATENT DOCUMENTS 410152 10/1966 Switzerland .............................. 310/227

*Primary Examiner*—R. Skudy
*Attorney, Agent, or Firm*—Holman & Stern

[57] ABSTRACT

A current supplying device comprises a slip ring mounted on a rotor shaft with an electrically insulating layer interposed therebetween, and contacting the brushes of the current collecting bus bars of the brush contact device of an electric machine. At least on one end of the slip ring a distribution ring is mounted to which a current supplying bus bar electrically connected with the rotor winding is secured and which contacts the slip ring through an additional electrically conductive layer formed of a material with a lower specific electric resistance than that of the material of the slip ring. Both the slip ring and the distribution ring are provided with through holes arranged around the circumference of these rings and having longitudinal axes parallel to longitudinal axes of these rings. Each one of the through holes of the slip ring corresponds to one of the through holes of the distribution ring and is coaxial therewith, so that they form an integral ventilating channel. In so formed ventilating channels, sleeves of the additional electrically conductive layer are disposed, which sleeves connect the distribution ring with the slip ring.

1 Claim, 3 Drawing Figures

CURRENT SUPPLYING DEVICE FOR ROTOR WINDING OF ELECTRIC MACHINE

FIELD OF THE INVENTION

The present invention relates to electric machines, and more particularly to current supplying devices for the rotor winding of an electric machine.

Most advantageously the present invention can be used in high speed powerful turbo generators wherein a prolonged continuous operation of a brush contact device of the generator should be combined with a reliable current supply to the rotor winding of the generator.

BACKGROUND OF THE INVENTION

There has been known a current supplying device for the rotor winding of an electric machine (cf., e.g., the Inventor's Certificate No. 256,043), comprising a slip ring made of high strength steel and intended for mounting onto the rotor shaft of an electric machine with an electrically insulating layer therebetween. This device also comprises a distribution ring which is mounted on the end of the slip ring and to which a current supplying bus bar electrically connected with the rotor winding of an electric machine is secured. The distribution ring is made of electrically highly conductive material and electrically contacts the slip ring through an additional electrically conductive layer formed as a number of segment shaped spacers which are mounted in the abutting arrangement around the circumference between the ends of the slip ring and distribution ring, the electric conductivity of each spacer increasing as it recedes along an arc from the point of attachment of the current supplying bus bar to the distribution ring to provide a uniform current distribution between the slip ring and the distribution ring. The brushes of the current collecting bus bars of the yoke of the electric machine brush contact device contact the outer periphery surface of the slip ring.

However, the known construction of the current supplying device for the rotor winding of the electric machine has a number of disadvantages.

Firstly, although the electric current flowing between the current collecting bus bar of the yoke of the brush contact device and the current supplying bus bar is rather uniformly distributed around the circumference of the end surface of the slip ring, it flows from the periphery surface of the slip ring, facing the brushes, to the end surface of the same ring, facing the distribution ring, along the paths of different lengths. This results in a nonuniform distribution of current across the slip ring width and over the brushes, if the latter are arranged in a number of rows, especially as the current flows through the material of that ring, which is steel of a high electric resistivity. This, in turn, results in nonuniform mechanical and electrical wear of brushes located in different rows and a subsequent nonuniform heating thereof as well as in nonuniform wear and consequent heating of the slip ring itself. As a result, equal operating conditions of all the brushes and of all the portions of the slip ring periphery surface are not provided, which decreases the reliability of operation of the brush contact device of the electric machine.

Secondly, among the disadvantages of the known construction is the fact that the segment shaped spacers are formed of a meterial with an increased specific electric resistance compared to the material of the distribution ring, and that contact electric resistances exist at the interface of the spacers with high exciting currents of the electric machine, this results in some increase in heat losses of the power supplied to the exciting winding.

Thirdly, the known construction of the current supplying device involves certain difficulties in manufacturing of the constituent elements and subsequent assembling thereof, since to provide a satisfactory operation of the construction it is necessary to utilize a definite number of the spacers having different conductivities and with the position of each spacer required to be carefully fixed by means of special mounting members. In order to obtain a value of the contact resistance of these spacers, not exceeding the predetermined one, and to decrease this value, which is necessary to minimize the spacer heating during operation of the electric machine, it is desirable to impose stringent processing requirements on the finish and precision of machining of the contacting surfaces of the spacers as they are manufactured, and on the careful matching of the spacers to one another when assembling the device.

And lastly, if said rings of this construction are provided with longitudinal ventilating channels, the current carrying capacity of the spacers and, consequently, the efficiency of their use decrease, since in this case, at the points of location of the openings the useful section of the end surfaces of the slip ring, the spacers, and the distribution ring is lost.

SUMMARY OF THE INVENTION

An object of the present invention is to provide a simple and reliable current supplying device for the rotor winding of an electric machine.

Another object of the present invention is to decrease a nonuniformity of distribution of the electric current flowing through a slip ring across the width of that ring.

Still another object of the present invention is to provide a current supplying device wherein an additional electrically conductive layer electrically connecting a slip ring with a distrubution ring, has an increased current carrying capacity.

Yet another object of the present invention is to increase the reliability of operation of the brush contact device and of the entire electric machine.

With these and other objects in view, there is proposed a current supplying device for the rotor winding of an electric machine, comprising a slip ring intended for mounting onto a rotor shaft, with an electrically insulating layer therebetween and for contacting the brushes of the current collecting bus bars of the brush contact device of an electric machine, and having mounted at least on one end of the slip ring a distribution ring, to which a current supplying bus bar electrically connected with the rotor winding is secured and which contacts the slip ring through an additional electrically conductive layer formed of a material with a specific electric resistance lower than that of the slip ring material, the slip ring and the distribution ring being formed with through holes having equal diameters, arranged around the circumference of these rings, and having longitudinal axes parallel to the longitudinal axes of these rings, each through hole of one ring corresponding to a respective one of the through holes of the other ring and being coaxial therewith, so that these through holes form an integral ventilating channel, with, according to the invention, the additional electrically conductive layer disposed on the inner surfaces of the ventilating channels.

The advantage of the proposed device resides in the fact that it provides a uniform distribution of the electric current flowing through the slip ring between the current collecting bus bar of the yoke of the brush contact device and the current supplying bus bar of the rotor winding, as a result of flowing of this current through the material of the slip ring along the paths having a relatively small and approximately equal length. This is due to the fact that the additional electrically conductive layer, because of its location in the ventilating channels, has a considerable area of contact with the slip ring across the whole width of the latter and is located closely to its periphery surface. Also, due to location of the electrically conductive layer in a number of ventilating channels, there is provided an opportunity of increasing the current carrying capacity without any increase and even with some decrease in geometrical dimensions of the entire device, and besides, there is provided a good cooling of the contact portions between the additional electrically conductive layer and the slip ring, as well as between this layer and the distribution ring.

BRIEF DESCRIPTION OF THE DRAWINGS

These and other objects and advantages of the invention will become more apparent upon consideration of the following detailed description of its preferred embodiment taken in conjunction with the accompanying drawings in which.

It should be noted that the accompanying drawings are merely a schematic illustration of the present invention, and that various changes in the shape, size, arrangement of parts, and so on are possible.

DETAILED DESCRIPTION OF THE INVENTION.

Figure 1:
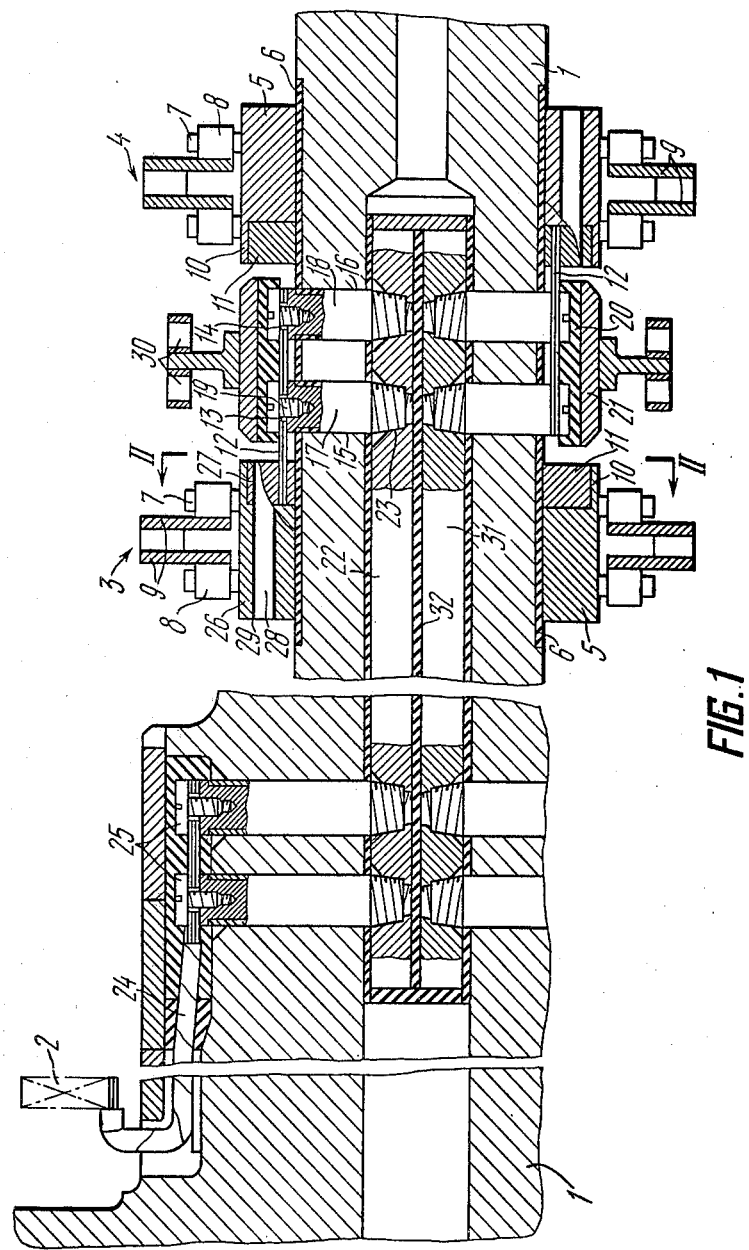
FIG. 1 shows a longitudinal section of a part of the rotor of an electric machine with a current supplying device for the rotor winding, according to the invention.

Referring now to FIG. 1, a rotor of an electric machine, specifically, the rotor of a powerful turbo generator, comprises a shaft 1 and a rotor exciting winding 2. A brush contact device of this generator comprises a positive current supplying device 3 and a negative current supplying device 4 intended both for supplying an exciting current to the rotor winding 2.

The positive current supplying device 3 comprises a slip ring 5 mounted on the rotor shaft 1 with an electrically insulating layer 6 therebetween and made of high strength steel. Around the periphery surface of the slip ring 5 are arranged brushes 7 contacting this surface and supported in brush holders 8 of current collecting bus bars 9 of the brush contact device of the generator. In the end portion of the slip ring 5 a cylindrical recess 10 is formed, bored coaxially with the inner bore of this ring. Mounted in the end cylindrical recess 10 of the slip ring 5 is a distribution ring 11 tightly pressed against the surfaces of the slip ring 5, with which it comes into contact. Built into the body of the distribution ring 11 is a current supplying bus bar 12 positioned at a point in close proximity to the inner surface of that ring. In the current supplying bus bar 12 there are two holes 13 and 14 which are positioned lengthwise on this bus bar, each of them being located, respectively, above one of radical holes 15 and 16 formed in the rotor shaft 1. Inserted into the holes 13, 15 and 14, 16 arranged in pairs on the same axes are current conducting screws 17 and 18, respectively, secured to the current supplying bus bar 12 by means of attachment screws 19. Slipped over the current conducting screws 17 and 18 are electrically insulating spacers 20 on which binding clips 21 are superposed secured to the rotor shaft 1 by bolts (not shown) and preventing the current conducting screws 17 and 18 from displacements caused by centrifugal forces which arise during operation of the generator. The current conducting screws 17 and 18 are connected with a positive connecting bus bar 22 by means of a tapered threaded connection 23. The connecting bus bar 22 connects the current conducting screws 17 and 18 with a terminating bus bar 24 of the rotor winding 2, the terminating bus bar 24 being secured to the connecting bus bar 22 by means of a current conducting screw 25 with a tapered thread.

Figure 2:
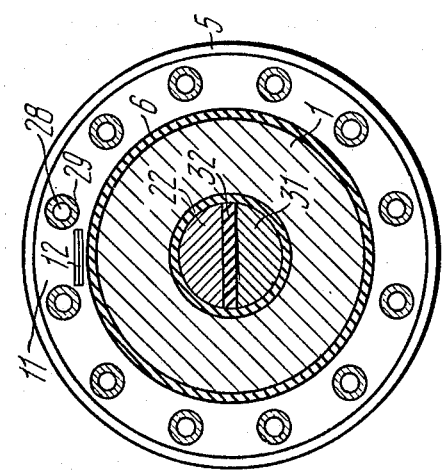
FIG. 2 shows the slip ring of a current supplying device, mounted onto the rotor shaft of an electric machine, a cross section along the line II—II of FIG. I.

Around the circumference of the slip ring 5 a number of through cylindrical holes 26 are formed, and the same number of through cylindrical holes 27 are formed around the circumference of the distribution ring 11 these holes having equal diameters and their longitudinal axes being parallel to the longitudinal axes of these rings. Each one of the through holes 26 of the slip ring 5 is coaxial with one of the through holes 27 of the distribution ring 11, so that each pair of these holes form an integral ventilating channel 28. The through holes 26 and 27 are formed in the body of the slip ring 5 and in the body of the distribution ring 11 in the points which are rather close to the periphery surfaces of these rings, and are equally spaced around the circumferences of these rings (FIG. 2). On the inner surface of each ventilating channel 28 (FIG. 1) there is disposed an additional electrically conductive layer 29 formed as a thin walled sleeve of a material having a specific electric resistance lower than that of the material of the slip ring 5. In this case, the additional electrically conductive layer 29 is in electrical contact both with the slip ring 5 and with the distribution ring 11, simultaneously, thus providing an electrical connection of the distribution ring 11 with the slip ring 5.

Between the current supplying devices 3 and 4 a blower 30 is mounted intended to supply air into the ventilating channels for cooling the slip ring 5, the distribution ring 11, and the additional electrically conductive layer 29, which are heated during operation of the generator.

The negative current supplying device 4 is almost identical to the positive current supplying device 3 and comprises the same elements indicated by the same reference numerals. The difference between them is that the current conducting screws 17 and 18 of the current supplying device 5 are screwed into a negative connecting bus bar 31 separated from the positive connecting bus bar 22 by an electrically insulating layer 32. The negative connecting bus bar 31 is here connected with the rotor winding 2 in the same manner and by the same elements as for the positive connecting bus bar 22.

The embodiment of the current supplying device (shown in FIG. 3), according to the invention, comprises besides the distribution ring 11, an additional distribution ring 33 mounted on the other end of the slip ring 5 in an end cyclindrical recess 34. The distribution ring 33 is also provided with a number of through cylindrical holes 35 arranged around its circumference, each of them having a diameter equal to that of the through holes 26, 27 of the slip ring 5 and of the distribution ring 11, respectively, and coaxial with one of the pairs of these holes, also forming part of one of the ventilating channels 29. Inserted into the distribution ring 33 is a current supplying bus bar 36 which is electrically connected with the positive connecting bus bar 22 by the current conducting screw 18, the current supplying bus bar 12 of the distribution ring 11 being now connected with the bus bar 22 by the only current conducting screw 17.

Manufacturing and assembling of the proposed device is performed as follows.

First, the end cylindrical recess 10 is bored in the blank for the slip ring 5 and the through cylindrical holes 26 are formed using a drill jig. Then the current supplying bus bar 12 is soldered into the blank for the distribution ring 11 and the through cylindrical holes are also formed in this ring using a drill jig. Following this, the assembling of the rings is performed. To accomplish this, the distribution ring 11 is mounted into the end recess 10 of the slip ring 5, appropriate alignment of the through holes 26 and 27 is obtained, the sleeves of the additional layer 29 are inserted into the aligned holes of the rings, and then the process of connecting the abovementioned elements into an integral unit is performed. The best results could be achieved when connecting the elements by blast welding or by expansion under high pressure using hydraulic devices. The use of these coupling methods provides a high quality of adherence of heterogeneous materials, while keeping the desired properties of these materials and forming an intermediate layer wherein these materials are uniformly distributed due to diffusion and which possesses good mechanical and electrical characteristics. When the process described above, is completed the boring of the inner diameter of the mounting surface of the assembled unit is performed. Then the unit is heated up to a predetermined temperature and fitted onto the electrically insulating layer 6 in the proper position of the generator rotor shaft 1, as a result of which, when it is cooled, a tight mechanical connection of the slip ring 5 with the rotor shaft 1 is provided. When the temperature of the device mounted onto the shaft 1 reaches the ambient temperature, the current supplying bus bar 12 is attached to the connecting bus bar 22 by means of the current conducting screws 17 and 18, and then these screws are secured to the rotor shaft by means of the electrically insulating spacers 20 and the clips 21.

Figure 3:
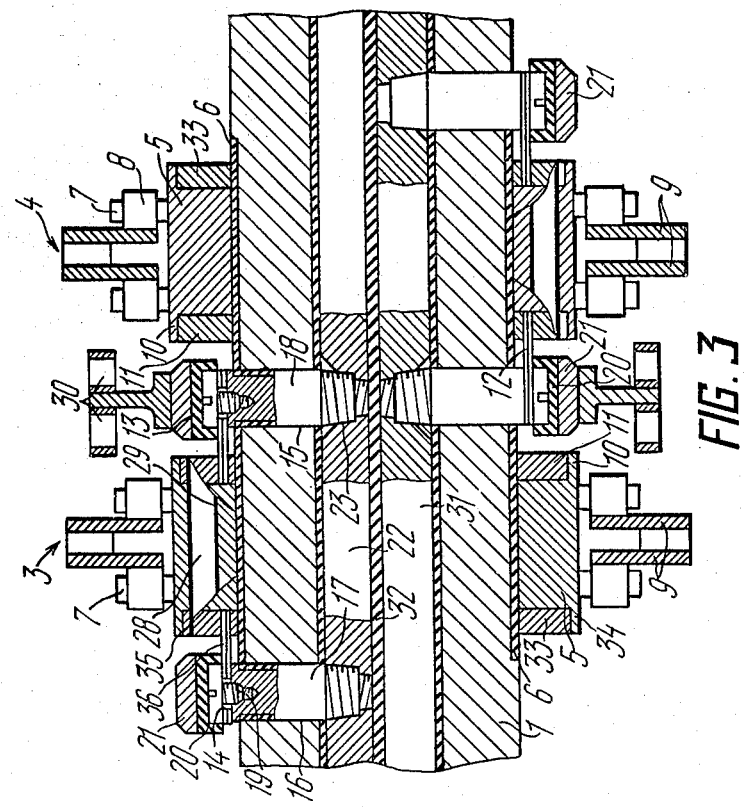
FIG. 3 shows a longitudinal section of another embodiment of a current supplying device, according to the invention.

In the embodiment of the present invention, shown in FIG. 3, upon mounting the distribution ring 11 in the cylindrical recess 10 of the slip ring 5, the distribution ring 33 with the through holes 35 predrilled in it in a manner mentioned above, is mounted in the cylindrical recess 34 formed in the other end of the slip ring 5 and only after that the process of coupling of the elements of the current supplying device into an integral unit is performed.

The slip ring 5 in both of the embodiments of the present invention is made of steel the use of which should provide the required strength of the ring, needed to counteract considerable centrifugal forces arising during operation of the generator and determined by the technique used in fitting thereof onto the shaft 1 when assembling. Besides, the steel used for manufacturing of this ring should exhibit an increased wear resistance. The distribution ring 11 is made of conventional electrical copper, and the sleeves of the additional electrically conductive layer 29 could be made either of electrical copper or of copper-based alloys, the use of which provides the most efficient adhesion of the sleeve surfaces of the additional layer 29 to the materials of the slip ring 5 and distribution ring 11, while keeping the required current carrying capacity of this layer. The walls of the sleeves of the additional electrically conductive layer 29 may have different thickness which is determined by various factors, such as, the type of a construction the output of the turbo generator, the conditions of cooling the current supplying device, etc. For example, in a turbo generator with an output of about 200 MW, an exciting current of about 2,600 A and a mounting diameter of the slip rings 5 equal to 300 mm, the wall thickness of the copper sleeve of the additional layer 29 is no more than two millimeters, the current density of this layer being equal to 2 A/sq mm.

The proposed device operates as follows.

The description of operation of the device will be made in conjunction with the positive current supplying device 3 (FIG. 1). When the exciting power is supplied to the generator, the electric current flows to the current collecting bus bars 9 of the generator brush contact device and then is distributed over the brushes 7 arranged in a number of rows (for simplicity, the brushes of only two rows are shown in the drawing) and equally spaced in each row around the periphery of the slip ring 5. Herein, the electric current flows from each brush 7 onto the portion of the surface of the slip ring 5, occupied by this brush, and further into the ring body. The current lines from each brush 7 to the additional layer 29 formed of a material with better electric conductivity than that of the material of the slip ring 5, pass along the body portions of the slip ring 5 having a minimum electrical resistance, i.e. along the shortest paths directed radially from the surface of this ring to the surface of the additional layer 29.

Since in powerful turbo generators with an output of 200 to 800 MW the values of the exciting current may be as great as 2,000 to 6,000 A, for effective cooling of the slip rings 5 through which the currents of such values flow, these rings are provided with a plurality of the ventilating channels 28 equally spaced around the circumference of the ring. Consequently, the number of the sleeves of the additional electrically conductive layer 29 is also rather great and they are equally spaced around the circumference of the slip ring 5. For given values of the generator exciting currents, the number of the brushes 7 contacting the periphery surface of the slip ring 5 may amount to a few dozens and the density of their distribution is rather high. Hence, for each brush 7 of one row, the lengths of the paths of the current flow from the periphery surface of the slip ring 5 to the outer surfaces of the sleeves of the additional layer 29 will be equal, as well as for the brushes 7 located in different rows. Due to this fact, for the current supplied from each brush 7, the electric resistance of the portions between the outer surfaces of the slip ring 5 and the sleeves of the additional layer 29 turns out to be essentially equal, and thus the current distribution around the circumference of the slip ring 5 is essentially uniform. As the current distribution around the circumference of the slip ring 5 for each row of the brushes 7 is uniform, the current distribution across the width of this ring is also rather uniform. The intermediate, or connecting, layer between the slip ring 5 and the sleeves of the additional electrically conductive layer 29 does not appreciably affect the operation of the current supplying device, since the electric resistance of this layer has a value in close agreement with the electric conductance properties of the material of the additional layer 29, which is determined by the use of the above mentioned coupling processes providing good electrical characteristics of the connecting layer.

From the sleeves of the additional layer 29 the electric current further flows into an area with a lower electric resistance, specifically, into the end distribution ring 11 the lower resistance of which is determined by its considerably greater cross section area at the point of its contact with the sleeve, compared to the cross section area of a single sleeve of the additional layer 29. At the distribution ring 11 the currents from all the sleeves of the additional layer 29 are summed and supplied to the current supplying bus bar 12 and further through the current conducting screws 17 and 18, the connecting bus bar 22, the current conducting screw 25, and terminating bus bar 24 to the rotor exciting winding 2.

The negative current supplying device 4 operates in a similar way, but the current flows in the opposite direction.

In the embodiment of the current supplying device shown in FIG. 3, the electric current flowing from the brushes 7 through the slip ring 5 to the sleeves of the additional layer 29, is further supplied along these sleeves not only to the distribution ring 11 but also to the distribution ring 33 where the currents from all the sleeves are summed in the same manner and supplied through the current supplying bus bar 36 and current conducting screw 19 to the connecting bus bar 22. At the connecting bus bar 22, the currents supplied thereto from the current supplying bus bars 12 and 36 are summed and also supplied through the current conducting screw 25 and terminating bus bar 24 to the exciting rotor winding 2.

In the device shown in FIG. 3, the electric current flowing through the slip ring 5 is somewhat more uniformly distributed across the width of this ring. This construction is suitable for the cases when it is required to provide the lay-out of the current supplying devices 3 and 4 of the generator brush contact device with a minimum distance between the slip rings 5, for which it is necessary to shorten the length of the current supplying bus bar 12 and to locate one of the current conducting screws 17 and 18 from the other side of the slip ring 5, or when strength requirements for the rotor shaft 1 render it impossible, with a predetermined density of the current flowing through the screws 17 and 18, to form in this shaft two closely spaced holes 15 and 16 wherein these screws are located.

The use of the proposed device in powerful high speed turbo generators wherein the slip rings 5 are subjected to large mechanical and electrical stresses, provides equal operating conditions of all the brushes 7 and of the slip ring 5 across the entire width thereof, due to a uniform distribution of the current flowing through this ring and good conditions of cooling of contacts at the interface of the additional electrically conductive layer 29 and the slip ring 5 and the distribution ring 11. This prevents nonuniform wear of the components and thus provides an improvement of operational reliability of the generator brush contact device and an increase in its continuous operation life.

The construction of the proposed device is rather simple, since the additional electrically conductive layer 29 also performs the function of mounting elements, and there is no need in special elements for securing the layer itself and the distribution ring II to the slip ring 5.

The proposed current supplying device is simple and easy to manufacture and assemble and provides an undetachable connection of the additional electrically conductive layer 29 with the slip ring 5 and the distribution ring 11 by such highly effective methods as blast welding or expansion under high pressure using hydraulic devices.

All this allows, during manufacturing of the device, to eliminate the processes of matching the constituent elements and to reduce the time needed for its assembling.

It is to be understood that the present invention is not limited by the embodiment herein described and illustrated, and that numerous modifications and other embodiments of the proposed current supplying device for the rotor winding of an electric machine are possible without departing from the true spirit and scope of the invention defined by the following claims.

What is claimed is:

1. In a brush contact device of an electric machine having a rotor with a shaft and a rotor winding, including current collecting bus bars with a plurality of brushes, a current supplying device for said rotor winding, comprising:
   a slip ring mounting on said rotor shaft with an electrical insulation therefrom and for contacting said brushes;
   at least one distribution ring mounted on the end of said slip ring;
   a current supplying bus bar secured to said distribution ring and electrically connected with said rotor winding;
   said slip ring and said distribution ring formed with a plurality of through holes arranged around the circumference of these rings, said holes having equal diameters and having longitudinal axes parallel to the longitudinal axes of said rings, and each of said through holes of one ring corresponding to one of said through holes of the other ring and being coaxial with it so that said through holes form an integral ventilating channel;
   an additional electrically conductive layer disposed on the inner surface of said ventilating channels and electrically connected said distribution ring with said slip ring;
   said additional electrically conductive layer formed of a material with a lower specific electric resistance than that of the material of said slip ring;
   whereby the electric current flowing between said current collecting bus bar and said current supplying bus bar through said slip ring, is uniformly distributed along the surface and in the body of said slip ring.

* * * * *